United States Patent
Mobarak et al.

(10) Patent No.: US 8,370,580 B2
(45) Date of Patent: ***Feb. 5, 2013

(54) TECHNIQUES FOR DIRECTORY SERVER INTEGRATION

(75) Inventors: Ayman Mobarak, San Francisco, CA (US); Nathan Moser, Cedar Park, TX (US); Chad Jamart, Clayton, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/436,713

(22) Filed: Mar. 30, 2012

(65) Prior Publication Data
US 2012/0191918 A1 Jul. 26, 2012

Related U.S. Application Data

(63) Continuation of application No. 12/768,364, filed on Apr. 27, 2010, now Pat. No. 8,209,491.

(51) Int. Cl.
*G06F 12/00* (2006.01)
*G06F 13/00* (2006.01)
*G06F 13/28* (2006.01)

(52) U.S. Cl. ................. 711/133; 711/E12.075; 711/134

(58) Field of Classification Search .................. None
See application file for complete search history.

(56) References Cited

U.S. PATENT DOCUMENTS

| | | | |
|---|---|---|---|
| 2002/0107877 A1* | 8/2002 | Whiting et al. | 707/204 |
| 2006/0004779 A1* | 1/2006 | Rossiter et al. | 707/10 |
| 2006/0041633 A1* | 2/2006 | Ramanathan et al. | 709/217 |
| 2008/0162498 A1* | 7/2008 | Omoigui | 707/10 |

* cited by examiner

*Primary Examiner* — Edward Dudek, Jr.
*Assistant Examiner* — Matthew Chrzanowski
(74) *Attorney, Agent, or Firm* — Wilmer Cutler Pickering Hale and Dorr LLP

(57) ABSTRACT

Techniques for directory server integration are disclosed. In one particular exemplary embodiment, the techniques may be realized as a method for directory server integration comprising setting one or more parameters determining a range of permissible expiration times for a plurality of cached directory entries, creating, in electronic storage, a cached directory entry from a directory server, assigning a creation time to the cached directory entry, and assigning at least one random value to the cached directory entry, the random value determining an expiration time for the cached directory entry within the range of permissible expiration times, wherein randomizing the expiration time for the cached directory entry among the range of permissible expiration times for a plurality of cached directory entries reduces an amount of synchronization required between cache memory and the directory server at a point in time.

18 Claims, 8 Drawing Sheets

| Cache Config | |
|---|---|
| Minimum TTL | 43200 seconds |
| Maximum TTL | 129600 seconds |
| ... | ... |
| ... | ... |
| ... | ... |

Fig. 6A

| Cache Config | |
|---|---|
| TTL | 86400 seconds |
| TTL Variance | 50% |
| ... | ... |
| ... | ... |
| ... | ... |

Fig. 6B

| Cache Entry | |
|---|---|
| Creation Timestamp | 1267158467763 (ms) |
| TTL Spread Factor | 39 |
| ... | ... |
| ... | ... |
| ... | ... |

Fig. 6C

Cache Entry

| Creation Timestamp | 1267158467763 (ms) |
|---|---|
| TTL Spread Factor | 39 |
| ... | ... |
| ... | ... |
| ... | ... |

Fig. 7A

Cache Config

| Minimum TTL | 43200 seconds |
|---|---|
| Maximum TTL | 129600 seconds |
| ... | ... |
| ... | ... |
| ... | ... |

Fig. 7B

Cache Config

| Minimum TTL | 86400 seconds |
|---|---|
| Maximum TTL | 259200 seconds |
| ... | ... |
| ... | ... |
| ... | ... |

Fig. 7C

TECHNIQUES FOR DIRECTORY SERVER INTEGRATION

CROSS-REFERENCE TO RELATED APPLICATIONS

This patent application is a continuation of U.S. patent application Ser. No. 12/768,364, filed Apr. 27, 2010, which is hereby incorporated by reference herein in its entirety.

FIELD OF THE DISCLOSURE

The present disclosure relates generally to directory data services and, more particularly, to techniques for directory server integration.

BACKGROUND OF THE DISCLOSURE

Directory data services may provide directory data for a variety of clients and applications including user authentication, message delivery, and the application of group policies. Directory data services may serve a plurality of applications in which high throughput is important such as, for example, enterprise class messaging security. Applications and/or directory data services may use cached directory data to improve performance and to reduce a load on a directory server. However, cached directory data may become "stale" or outdated if it is not refreshed by querying a directory server periodically. Updating cached directory data may place a large burden on a directory server causing significant performance degradation as large volumes of cached data are updated periodically. The performance degradation may in turn affect clients and applications using directory data services.

In view of the foregoing, it may be understood that there may be significant problems and shortcomings associated with current directory server integration technologies.

SUMMARY OF THE DISCLOSURE

Techniques for directory server integration are disclosed. In one particular exemplary embodiment, the techniques may be realized as a method for directory server integration comprising setting one or more parameters determining a range of permissible expiration times for a plurality of cached directory entries, creating, in electronic storage, a cached directory entry from a directory server, assigning a creation time to the cached directory entry, and assigning at least one random value to the cached directory entry, the random value determining an expiration time for the cached directory entry within the range of permissible expiration times, wherein randomizing the expiration time for the cached directory entry among the range of permissible expiration times for a plurality of cached directory entries reduces an amount of synchronization required between cache memory and the directory server at a point in time.

In accordance with other aspects of this particular exemplary embodiment, the one or more parameters determining a range of permissible expiration times for a cached directory entry may comprise a maximum Time To Live parameter and a minimum Time To Live parameter.

In accordance with further aspects of this particular exemplary embodiment, the one or more parameters determining a range of permissible expiration times for a cached directory entry may comprise a Time To Live parameter and a Time To Live variance parameter.

In accordance with additional aspects of this particular exemplary embodiment, the techniques may further comprise receiving a request for a directory entry, determining whether a corresponding directory entry is expired based at least in part on the creation time and the at least one random value, and in the event the directory entry is expired, requesting the directory entry from the directory server.

In accordance with additional aspects of this particular exemplary embodiment, the techniques may further comprise determining that the directory server is inaccessible, and providing the corresponding expired cached directory entry in response to the request.

In accordance with additional aspects of this particular exemplary embodiment, the techniques may further comprise determining whether the directory entry is cached, and in the event the directory entry is not cached, requesting the directory entry from the directory server.

In accordance with additional aspects of this particular exemplary embodiment, the techniques may further comprise receiving a response from the directory server, detecting a data integrity error based at least in part on the response from the directory server, and providing an alert containing data integrity error information to an administrator.

In accordance with additional aspects of this particular exemplary embodiment, the directory server may comprise an LDAP compliant directory server.

In accordance with additional aspects of this particular exemplary embodiment, the request may be received from an electronic device which may comprise a gateway appliance separate from a host of the directory server.

In accordance with additional aspects of this particular exemplary embodiment, the request may be received from an electronic device comprising a host sharing cache among a plurality of gateway appliances separate from a host of the directory server.

In accordance with additional aspects of this particular exemplary embodiment, the request may be received from an electronic device comprising an electronic device which uses one or more cached directory entries to provide at least one of: user authentication, recipient validation, address resolution, and message routing.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for directory server integration, the article of manufacture comprising at least one processor readable medium. Instructions may be stored on the at least one medium, wherein the instructions are configured to be readable from the at least one medium by at least one processor and thereby cause the at least one processor to operate so as to set one or more parameters determining a range of permissible expiration times for a plurality of cached directory entries, create, in electronic storage, a cached directory entry from a directory server, assign a creation time to the cached directory entry, and assign at least one random value to the cached directory entry, the random value determining an expiration time for the cached directory entry within the range of permissible expiration times, wherein randomizing the expiration time for the cached directory entry among the range of permissible expiration times for a plurality of cached directory entries reduces an amount of synchronization required between cache memory and the directory server at a point in time.

In yet another particular exemplary embodiment, the techniques may be realized as a system for directory server integration comprising one or more processors communicatively coupled to a network, wherein the one or more processors are configured to set one or more parameters determining a range of permissible expiration times for a plurality of cached directory entries, create a cached directory entry from a directory server, assign a creation time to the cached directory entry; and assign at least one random value to the cached directory entry, the random value determining an expiration time for the cached directory entry within the range of permissible expiration times, wherein randomizing the expiration time for the cached directory entry among the range of permissible expiration times for a plurality of cached directory entries reduces an amount of synchronization required between cache memory and the directory server at a point in time.

In accordance with additional aspects of this particular exemplary embodiment, the one or more parameters determining a range of permissible expiration times for a cached directory entry may comprise a maximum Time To Live parameter and a minimum Time To Live parameter.

In accordance with additional aspects of this particular exemplary embodiment, the one or more parameters determining a range of permissible expiration times for a cached directory entry may comprise a Time To Live parameter and a Time To Live variance parameter.

In accordance with additional aspects of this particular exemplary embodiment, the one or more processors may further be configured to receive a request for a directory entry, determine whether a corresponding directory entry is expired based at least in part on the creation time and the at least one random value, and in the event the directory entry is expired, request the directory entry from the directory server.

In accordance with additional aspects of this particular exemplary embodiment, the one or more processors may further be configured to determine that the directory server is inaccessible, and provide the corresponding expired cached directory entry in response to the request.

In accordance with additional aspects of this particular exemplary embodiment, the one or more processors may further be configured to determine whether the directory entry is cached, and in the event the directory entry is not cached, request the directory entry from the directory server.

In accordance with additional aspects of this particular exemplary embodiment, the one or more processors may comprise a part of a gateway appliance separate from a host of the directory data service.

In accordance with additional aspects of this particular exemplary embodiment, the one or more processors may further be configured to use one or more cached directory entries to provide at least one of: user authentication, recipient validation, address resolution, and message routing.

In still another particular exemplary embodiment, the techniques may be realized as a method for directory server integration comprising: requesting a directory entry from a directory server, detecting, using a processor, a data integrity error based at least in part on the response from the directory server, and providing an alert containing data integrity error information to an administrator.

In accordance with additional aspects of this particular exemplary embodiment, the data integrity error may comprise at least one of: email address non-uniqueness, username non-uniqueness, missing or invalid attribute data, and circular group relationships.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIGS. 6A, 6B, and 6C depict an interface for setting directory data service cache parameters in accordance with an embodiment of the present disclosure.

FIGS. 7A, 7B, and 7C depict an interface for setting directory data service cache parameters in accordance with an embodiment of the present disclosure.

DETAILED DESCRIPTION OF EXEMPLARY EMBODIMENTS

Figure 1:
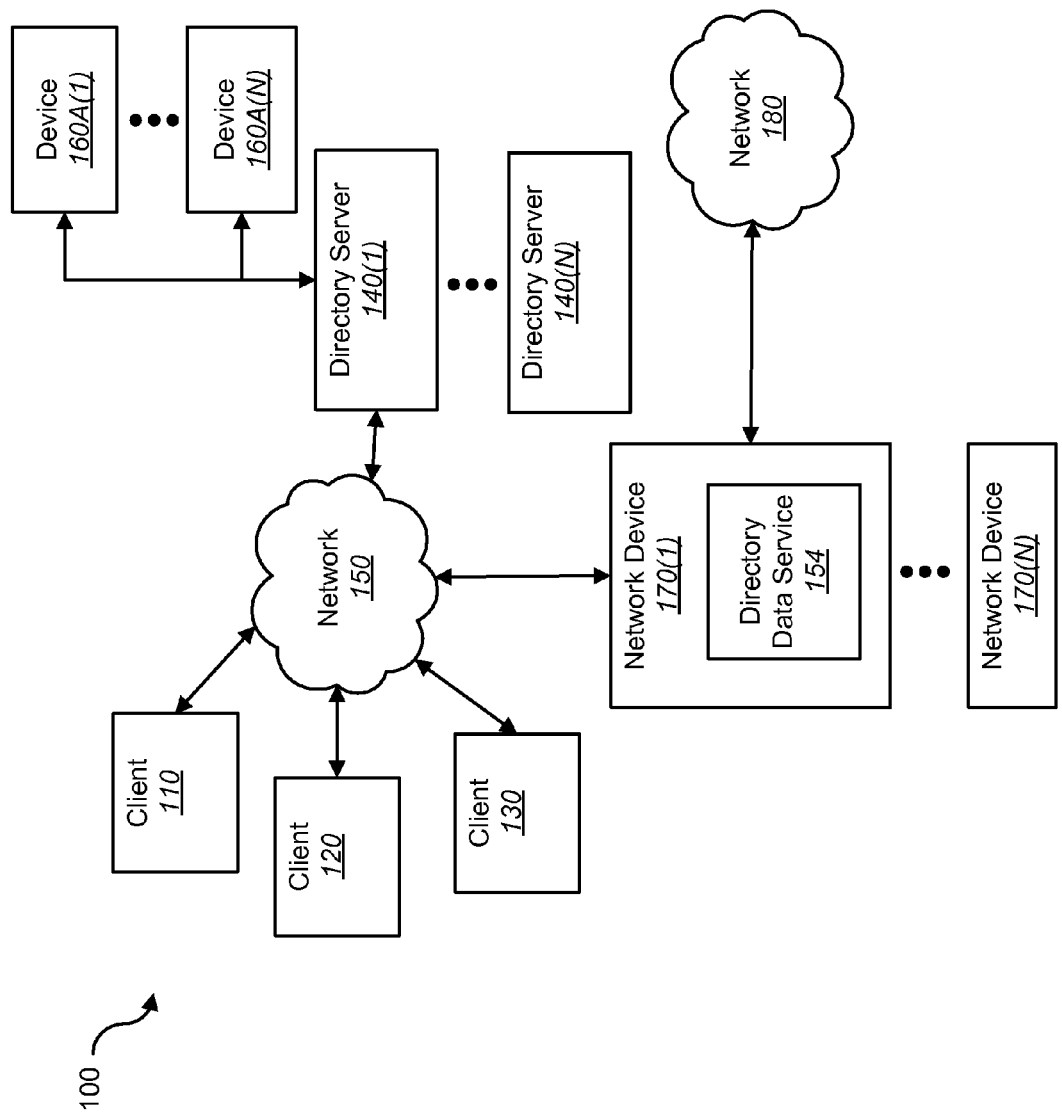
FIG. 1 shows a block diagram depicting a network architecture for directory server integration in accordance with an embodiment of the present disclosure.

FIG. 1 shows a block diagram depicting a network architecture 100 for directory server integration in accordance with an embodiment of the present disclosure. FIG. 1 is a simplified view of network architecture 100, which may include additional elements that are not depicted. Network architecture 100 may contain client systems 110, 120 and 130, as well as directory servers 140(1)-(N) and network devices 170(1)-(N) (one or more of which may be implemented using computer system 200 shown in FIG. 2). Client systems 110, 120 and 130 may be communicatively coupled to a network 150. Directory servers 140(1)-(N) may be communicatively coupled to storage devices 160(1)-(N). Network devices 170(1)-(N) may contain a management module (e.g., directory data service 154).

Figure 2:
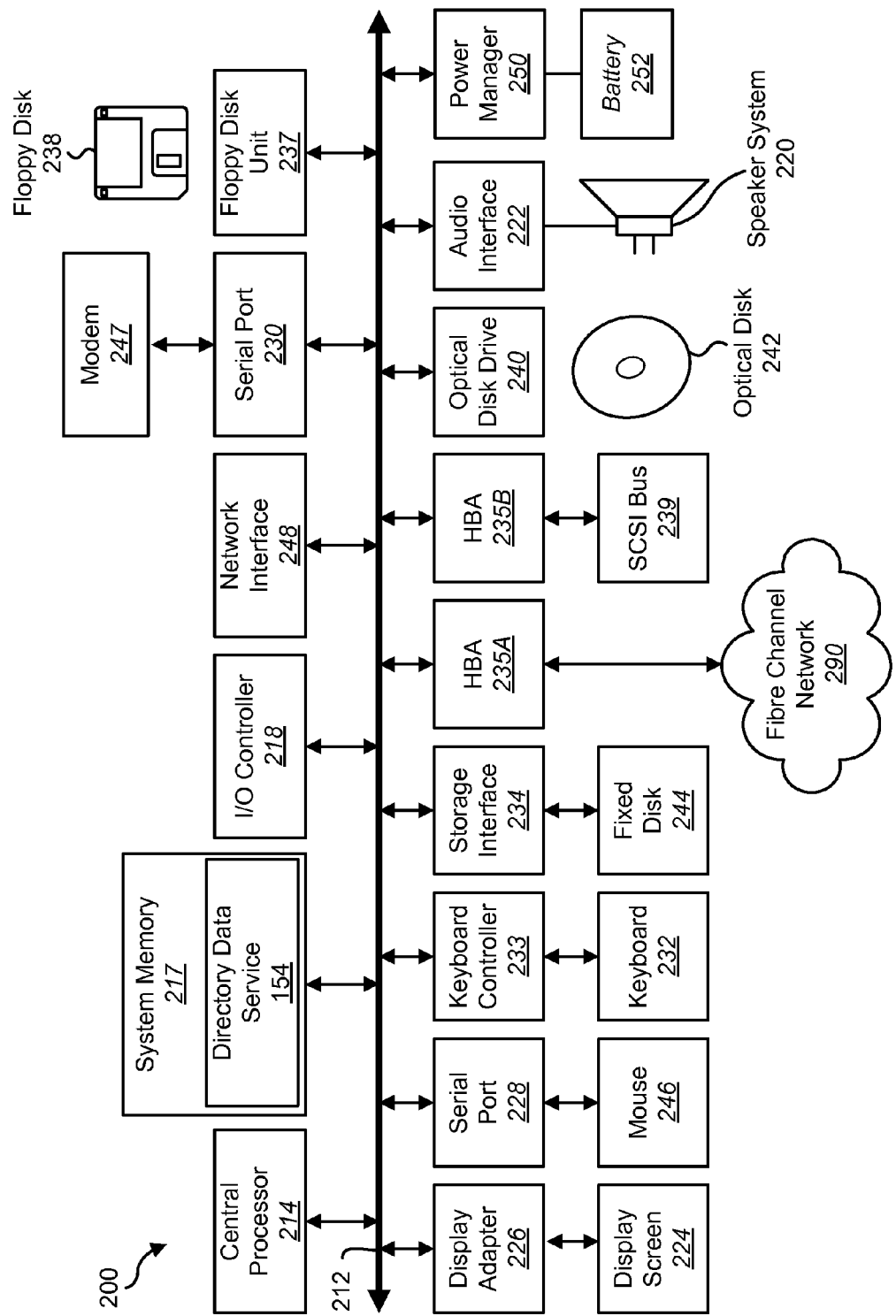
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on directory servers 140(1)-(N) using, for example, a Lightweight Directory Access Protocol (LDAP) client or other client software. Such a client may allow client systems 110, 120 and 130 to access data hosted by directory servers 140(1)-(N) or one of storage devices 160(1)-(N).

Networks 150 and/or 180 may be a local area network (LAN), a wide area network (WAN), the Internet, a cellular network, a satellite network, or another network that permits communication between clients 110, 120, 130, directory servers 140(1)-(N), and other devices communicatively coupled to networks 150 and/or 180. Networks 150 and/or 180 may further include one, or any number, of the exemplary types of networks mentioned above operating as a stand-alone network or in cooperation with each other. Networks 150 and/or 180 may utilize one or more protocols of one or more clients or servers to which it is communicatively coupled. Networks 150 and/or 180 may translate to or from other protocols to one or more protocols of network devices. Although networks 150 and 180 are each depicted as a single network, it should be appreciated that according to one or more embodiments, networks 150 and/or 180 may comprise a plurality of interconnected networks.

Storage devices 160(1)-(N) may be network accessible storage and may be local, remote, or a combination thereof to directory servers 140 (1)-(N). Storage devices 160(1)-(N), may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160(1)-(N) may be used for backup or archival purposes.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

Directory servers 140(1)-(N) may be one or more of a host for directory server implementations such as for example, a Microsoft® Active Directory® Server, an IBM® Lotus® Domino® Server, a Sun® Directory Server, an LDAP compliant directory server, a database server, a server containing one or more flat files or other data structures (e.g., XML), or other devices communicatively coupled to network 150. Directory servers 140(1)-(N) may utilize one or more of storage devices 160(1)-(N) for the storage of application data, backup data, or other data. One or more of directory servers 140(1)-(N) may be a host, such as an application server, which may process data requests for clients 110, 120, and 130.

According to some embodiments, network 180 may represent the Internet and network devices 170 may be devices handling a high volume of data traffic between network 150, which may be a corporate WAN or LAN, and network 180. For example, one or more of network devices 170 may be a mail gateway, a web gateway, or another appliance or application using directory data services for user authentication and/or authorization, identity management, recipient validation, address resolution, message routing, access control, or other application behavior. By way of non-limiting example, one or more of network devices 170 may be a Symantec® Brightmail® Gateway, a Symantec® Web Gateway, a Symantec® Data Loss Prevention Host, a Symantec® Endpoint Protection Application, or a Brightmail® Message Filter. One or more of network devices 170 may use directory data service 154 to manage cached data from one or more directory servers. According to some embodiments, each network device 170 may cache its own data. According to one or more embodiments, cached data may be shared among two or more of network devices 170. For example, network device 170(1) may be a control center host for a plurality of Brightmail Gateway scanners. The control center host may contain cached directory service data shared among a plurality of other network devices 170 which may be Brightmail Gateway scanners. Cached data may be stored on a network device 170 or in electronic storage communicatively coupled to a network device 170.

Directory data service 154 may a component of a network device, a module, or another combination of hardware and software integrated to manage directory data cache operations. According to some embodiments, directory data service 154 may provide a unified service-oriented architecture for directory integration with a gateway appliance, or another device or application using directory data services for high throughput processing.

Directory data service 154 may allow the management of cached data from a directory server such as for example, directory server 140(1). Directory data service 154 may also manage requests for directory data. Caching data may allow faster performance for a network device such as a mail gateway and may offload a burden from one or more directory servers 140. Building an initial cache may, however, pose a significant load. According to one or more embodiments, directory data service 154 may preload cached directory data prior to use by a network device. Cached data may need to be refreshed periodically so that the cached data does not become "stale" (e.g., omit changes to the directory data which may have occurred on a directory server.) A large number of cache entries may be created at a same time or within a same narrow time period. Setting a large number of cache entries with a same Time To Live (TTL) setting or other similar setting which determines the expiration of the cache entry may result in a large number of queries to a directory server to refresh a large number of cache entries in a short time period. This undesirable behavior may cause a spike, performance problems, or other undesirable behavior on a directory server and/or on an application or device using a directory server.

According to one or more embodiments of the present disclosure, expiration times (e.g., TTL settings) of cached entries may be varied so that a large number of cached entries do not burden a directory server with refresh requests (e.g., LDAP queries to a LDAP compliant directory server) at a same point in time. For example, one or more parameters determining a range of permissible expiration times for a plurality of cached directory entries may be set by an administrator. Directory data service 154 may provide a user interface and/or accept set parameters. When a cached directory entry from a directory data service is created it may be assigned a creation time by directory data service 154. The cached directory entry may also be assigned one or more random values by directory data service 154. The one or more random values may determine an expiration time (e.g., a Time To Live (TTL)) for the cached directory entry within the range of permissible expiration times. Randomizing the expiration time for the cached directory entry among the range of permissible expiration times for a plurality of cached directory entries may reduce an amount of synchronization (e.g., refresh requests) required between the cache memory of a network device 170 and a directory server 140 at a point in time. Thus, the cached entries may have their TTL settings distributed across a range of permissible Time To Live settings so that a directory server does not incur a performance spike or other degradation.

According to some embodiments, an administrator or other user may determine a range of permissible expiration times for a cached directory entry by setting a maximum Time To Live parameter and a minimum Time To Live parameter. A cached entry may be assigned an expiration date or Time To Live setting within a range determined by the maximum Time To Live parameter and the minimum Time To Live parameter. A Time To Live setting may be set at the time of the creation of a cached directory entry. According to other embodiments, an administrator or other user may determine a range of permissible expiration times for a cached directory entry by setting a Time To Live parameter and a Time To Live variance parameter. The Time To Live variance parameter may determine a maximum amount a cached directory entry may vary from a Time To Live parameter. For example, Time To Live variance parameter may be expressed as a percentage (e.g., a percentage between 0% and 100%). The Time To Live variance parameter may be converted to a decimal, subtracted from 1 and then multiplied by the TTL to determine a minimum TTL. The Time To Live variance parameter may then be converted to a decimal, added to 1 and then multiplied by the TTL to determine a maximum TTL. Other methods and parameters may be used to identify or determine a range of Time To Live settings over which to distribute individual cache entry TTL settings. According to some embodiments, a TTL range, a TTL, or a TTL variance may increase or decrease based on one or more factors. For example, a TTL and/or a TTL range may increase or decrease based on a cache size, a directory server load or other factors. A directory data source may be a configuration of a directory data service (DDS) that may specify how to connect to and query a particular directory server. According to one or more embodiments, a TTL range may be different based on a directory data source. For example, if a portion of cache is associated with a first directory data source and a second portion of cache is associated with a second directory data source, the different portions may be assigned different TTL ranges.

According to some embodiments, whether a cache entry has expired may be determined by calculating the elapsed time since the creation time of the cache entry and comparing the elapsed time to the Time To Live (TTL) for the entry. For example elapsed time may be calculated as:

elapsed=(currentTime−creationTime)*1000; //seconds

As described above, there may be several different algorithms used to calculate a TTL for a cache entry. For example, an entry Time To Live (entryTTL) may be calculated as:

entryTTL=minTTL+((maxTTL−minTTL)*(ttlSpreadFactor/100.0)); //seconds

A ttlSpreadFactor may be a random number (e.g., 50) between 0 and 100 (inclusive). MinTTL may represent a minimum Time To Live for a cache entry and max TTL may represent a maximum Time To Live for the entry. Thus MinTTL and MaxTTL may determine a permissible range and the ttlSpreadfactor may be a random number used to distribute cache entries along that range.

Once elapsed time and the Time To Live for the cache entry have been determined, the expiration determination may be:

isExpired=(elapsed>entryTTL).

If a cache entry is expired, directory data service 154 may attempt to refresh the cache entry by querying a directory server (e.g., an LDAP query to an LDAP compliant directory server). The cache entry may be received and updated or created in the cache with a new creation time set and a new TTL calculated.

According to some embodiments, if a cached directory entry is expired and the corresponding directory server is unavailable, then the cached directory entry may be provided in response to a request even though it is expired. In the event a directory server is redundant to another directory server (e.g., they contain the same directory entries), a query to a directory server may fail over from the first server to the second server. For example, a round robin DNS (Domain Name Server) scheme may be used to failover to redundant directory servers. According to some embodiments, load balancing and/or failover may be implemented at a directory server (e.g., LDAP) tier. According to one or more embodiments, when there is a data access failure (e.g. network problem, or a directory server is down), directory data service 154 may service requests with data from the cache if it is available. For this reason, data may not be deleted from a data source cache unless size limits have been exceeded. For example, there may be a fast failover mode which may initiate when several data access failures have been detected in a short period of time. This may cause the data source to immediately serve up the cache data if it is available, whether it is expired or not, or to fail immediately with an exception (e.g., DataAccessUnavailableException) without incurring the overhead of a data access call. This may allow directory data service 154 to maintain high throughput when directory server resources are unavailable. According to an embodiment, a directory data service 154 fast failover configuration may be implemented as follows.

If five data access failures are detected in a period of 120 seconds, switch to fast-failover for 300 seconds. If there is no cached data to failover to for a particular request, the Directory Data Service (DDS) call may fail with a transient error. For recipient validation, such transient errors may result in an SMTP (Simple Mail Transfer Protocol) error directing upstream senders to retry the message. For the other functions, these errors may cause messages to remain in various internal MTA (Message Transfer Agent) queues where they may be retried.

According to some embodiments, cache data may take precedence over a redundant directory data source. Setting an order of precedence among directory data sources and caches may be configurable. For example, consider the case where the system has been configured with two identical recipient validation sources, SourceA and SourceB, where SourceA is the first source in query order. Under normal circumstances, only SourceA may be queried for valid recipients. Early termination and sticky refresh may ensure that SourceB is not accessed for those recipients. Early termination may be the termination of a search against a directory data service configured with multiple data sources without verifying the uniqueness of the search results (e.g., in the case of recipient validation the search may stop at a first data source in which the requested directory entry is found). Sticky refresh may be a preference defined under which a directory entry in a cache is associated with a particular data source and the directory data service attempts to refresh the directory entry from that same data source when the directory entry expires (e.g., as long as the directory entry may be refreshed from the same data source, other data sources in the system will not be queried for it). Under normal circumstances, both sources may be queried for invalid recipients. If SourceA is down, cached valid recipients may be served from the SourceA cache, Source B may not be consulted. If SourceA is down, uncached valid recipients may be served from SourceB. Sticky refresh may cause them to be subsequently served from SourceB. If SourceA is down, cached-but-unexpired invalid recipients may be handled the same as under normal circumstances. If SourceA is down, uncached or cached-but-expired invalid recipients may cause an error instructing a requestor to try again later. Two directory data sources may be redundant or disjoint, thus it is possible that a recipient is valid in a down directory data source (e.g., source A) and may not be invalid if it is not found in any of the other sources.

According to some embodiments, if SourceB is down, cached valid recipients may be served from the SourceA cache, Source B may not be consulted. If SourceB is down, uncached valid recipients may be served from SourceA. Early termination and sticky refresh may cause them to be subsequently served from SourceA. If SourceB is down, cached-but-unexpired invalid recipients may be handled the same as under normal circumstances If SourceB is down, uncached or cached-but-expired invalid recipients may cause an error directing a requestor try again later When a directory data source is down it may fail over to cache data if it is available. The directory data service 154 may log a data access error and may generate a data access alert. However, directory data service 154 may continue to search other data sources. If a unique entry is found in one of the healthy sources, the call may succeed and sticky refresh may direct subsequent requests for that entry to that source. If more than one entry is found, a uniqueness error may be logged and directory data service 154 may generate a data integrity alert. If no matching entries are found, a request may fail with a transient error code and may be retried.

According to some embodiments, directory data service 154 may detect one or more data integrity errors or other errors and may provide logging and/or alerting associated with the errors. For example, directory data service 154 may encounter data errors during processing and may log the errors and/or provide an alert to an administrator. Detected data errors may include, by way of non-limiting example, email address non-uniqueness, username non-uniqueness, missing or invalid attribute data (e.g., missing email address, invalid email address format, group membership attribute referring to a non-existent entry, and inconsistent values for child and parent group membership attributes), and circular group relationships. Directory data service 154 may integrate with a variety of directory data. For example, directory data service 154 may access directory servers 140(1) . . . (N), which may be LDAP directories, SQL databases, and/or servers containing flat files. Directory data service 154 may access a directory server (e.g., an LDAP query) seeking an email address or other data. Based on received data, directory data service 154 may detect a data integrity error. A received email address may correspond to multiple directory entries in a single data source or across multiple data sources or a username may correspond to multiple directory entries in a single data source or across multiple data sources. According to some embodiments, in addition to data integrity errors, other errors handled by directory data service 154 may include: directory data access errors (e.g., failed to read data from an LDAP server), an undersized data source cache error (e.g., indicates that a data source cache or cache index is not large enough to hold all of the requested data in memory), and/or a data replication error (indicates that a data replication operation has failed).

Directory data service 154 may provide directory server data access alerts. This type of alert may be triggered when the directory data service 154 cannot read data from a directory server (e.g., an LDAP server). This may occur for a wide variety of reasons. Some examples may include: an LDAP server is down, network infrastructure problems, DNS issues, firewall rules blocking requests, bad data source admin bind credentials, and/or an LDAP search timeout.

Other alerts handled by directory data service 154 may include directory server data integrity alerts. This type of alert may be triggered when directory data service 154 has detected a problem with directory data that prevents the successful execution of a request. Data integrity issues that do not result in the failure of requests may be logged by directory data service 154 at a "WARNING" level and may not trigger alerts. For recipient validation, if multiple entries are returned for a search on the recipient address (within a single data source or across multiple sources), the event may be logged by directory data service 154 at an "INFO" level, and no alert may be generated. Duplicate recipients may be considered valid for the purposes of the recipient validation function. The following data integrity errors may trigger an alert:

More than one entry is returned for a search on an email address (within a single data source or across multiple sources).

More than one entry is returned for a search on a username (within a single data source or across multiple sources).

The following data integrity issues may be logged by directory data service 154 at "WARNING" level, and may not trigger alerts: circular group references, invalid group membership attribute values, missing primary email attribute value, and/or invalid format for email address value.

Circular group references may be recognized by directory data service 154 when a directory server is being traversed from the top down to determine group membership. For example if group A is a member of group B and group B is a member of group A, directory data service 154 may detect this and log an error. Group relationships may be nested many levels deep so a circular group reference may occur several levels down. For example, assuming groups are nested from parent through child from A-E, group B may be member of group E causing a circular group reference. According to some embodiments, a recursive tree traversal algorithm may be used that may determine that a particular node of a tree (i.e., a group) has been visited before. This may indicate a circular group reference. Circular group references may be detected with in a data source (e.g., a single directory server) or across data sources.

Directory data service 154 may also provide DDS Cache Size Alerts. This type of alert may be triggered when directory data service 154 evicts a cache entry before it is expired to make room for a new entry that has been fetched from the data access layer. The alerts and log statements may steer the administrator to take the appropriate action. Exemplary alerts include:

Entry Cache
remedy: increase cache size
Recipient Ref Cache (Cache Index on Email Address)
remedy: increase cache index size multiplier (i.e., a parameter determining the size of a cache index; e.g., a parameter N which sets the cache index size=(N×cache size).
User Ref Cache (Cache Index on Username)
remedy: increase cache index size multiplier Alert files may communicate the host, the specific type of alert condition, and the time of the triggering incident. The alert text may direct administrators to the system log files for additional diagnostic information. This may allow change or extension of functionality of the alerts with less development impact.

Generated Alert Emails May Contain the Following Information:

The timestamp of the alert event;
The host identifier for the alert event;
The component that generated the alert event (e.g., directory data service 154); and
A localized message corresponding to a predefined directory data service status code.

The status codes may be coarse-grained and there may be many possible error conditions that could result in a particular code. The alert mechanism may simply communicate that the DDS instance on a particular host was unable to process requests at a particular time, and may refer the administrator to the logs for detailed information about a root cause.

There may be user interface elements (e.g., checkboxes) to enable or disable one or more subtypes of DDS data access alerts, DDS data integrity alerts, DDS cache size alerts, user preference replication alerts, or other types of alerts.

Directory data service 154 may log one or more data integrity errors or other errors and alerts may be generated by a separate mechanism. For example, directory data service 154 may create an alert file on disk or in other electronic storage. The alert file may contain a timestamp and an identifier indicating a type of alert condition. A process or agent running on network device 170 may periodically poll for alert files, process alert metadata, and send an alert email to one or more users (e.g., registered system administrators). Other communication channels may be used to notify a user including, but not limited to: SMS text messages, voicemail, and/or a webpage posting. According to some embodiments, directory data service 154 may send an alert directly without the use of an additional process or agent. According to one or more embodiments, directory data service 154 or another process may send an alert using an interface (e.g., via SNMP, a Windows System Event, or a custom IPC (inter-process communication)).

Detection of data integrity errors by directory data service 154 and prompt alerting of a system administrator may enable a system administrator to address issues prior to system degradation or failure.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, directory data service 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
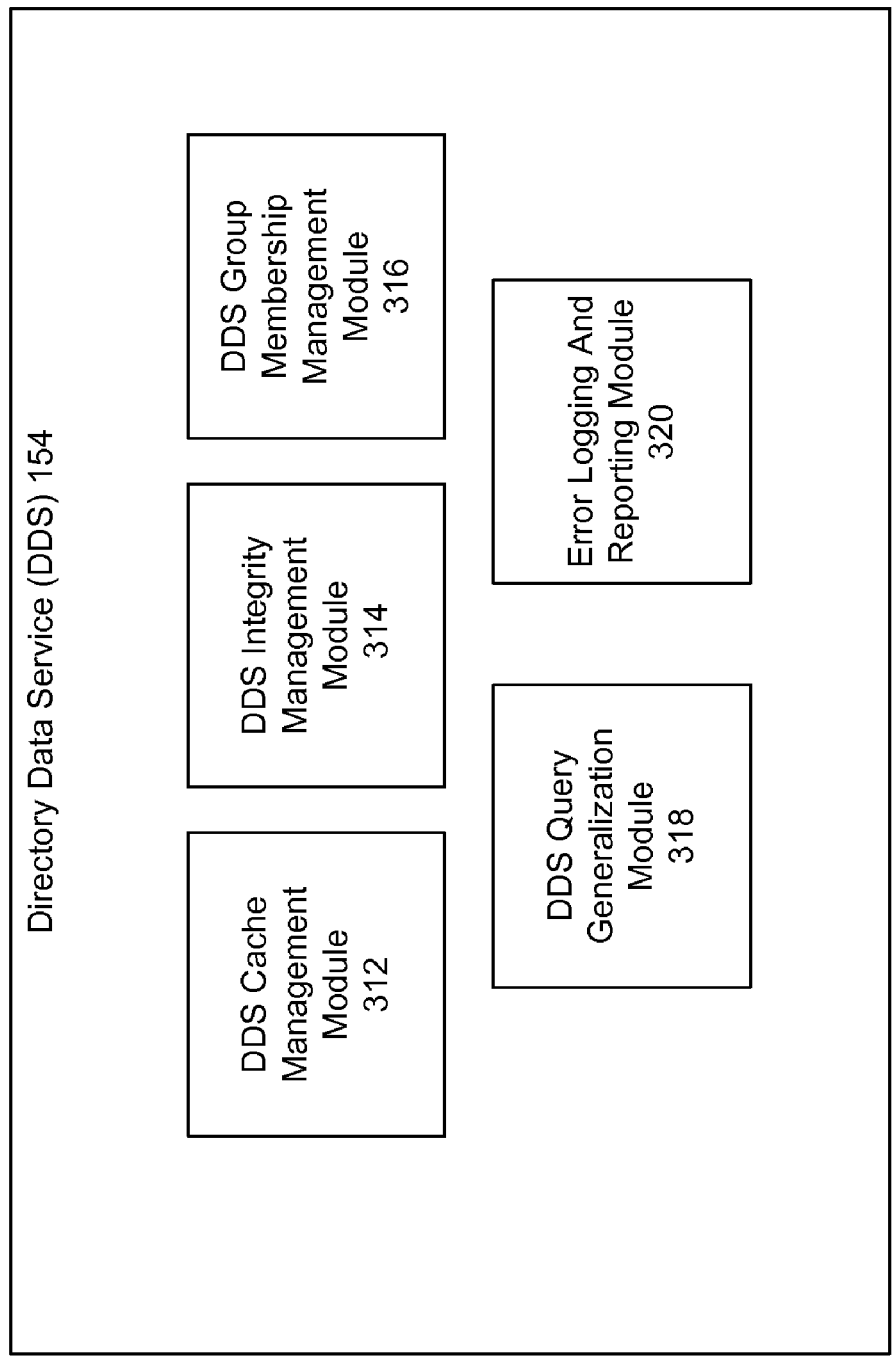
FIG. 3 shows a module for directory server integration in accordance with an embodiment of the present disclosure.

Referring to FIG. 3, there is shown a directory data service module 154 in accordance with an embodiment of the present disclosure. As illustrated, the directory data service module 154 may contain one or more components including directory data service (DDS) cache management module 312, directory data service integrity management module 314, directory data service group membership management module 316, directory data service query generalization module 318, and error logging and reporting module 320.

The description below describes network elements, computers, and/or components of a system and method for directory server integration that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Directory data service (DDS) cache management module 312 may handle one or more aspects of cache management. For example, DDS cache management module 312 may receive, calculate, and/or set TTL settings, TTL ranges, or other cache expiration parameters. DDS cache management module 312 may determine when to expire a cache entry based on one or more TTL parameters, a creation time of the cache entry, elapsed time since a creation time, and/or other factors. DDS cache management module 312 may establish cache size limits and cache entry eviction policies for data source caches and cache indexes. Cache index sizes may be determined by one or more parameters (e.g., a cache index multiplier parameter which may define the size of a cache index as a simple multiple of its associated data source cache).

DDS cache management module 312 may determine failover behavior based on one or more settings and/or detected conditions. DDS cache management module 312 may receive, set, and/or enforce settings for an order of precedence between data sources and/or cache.

Directory data service integrity management module 314, may detect one or more data integrity errors, or other errors and may provide logging and/or alerting associated with the errors. For example, directory data service integrity management module 314 may encounter data errors during processing and may log the errors and/or provide an alert to an administrator. Detected data errors may include, by way of non-limiting example, email address non-uniqueness, username non-uniqueness, missing or invalid attribute data (e.g., missing email address, invalid email address format, group membership attribute referring to a non-existent entry, and inconsistent values for child and parent group membership attributes), and circular group relationships. Directory data service integrity management module 314 may integrate with a variety of directory data. For example, directory data service integrity management module 314 may access directory servers 140(1) . . . (N), which may be LDAP directories, SQL databases, and/or servers containing flat files. Directory data service integrity management module 314 may access a directory server (e.g., via an LDAP query) seeking a directory entry or other data. Based on received data, directory data service integrity management module 314 may detect a data integrity error. For example, a search on an email address or a username may correspond to multiple directory entries in a single data source or a username may correspond to multiple directory entries in a single data source or across multiple data sources. According to some embodiments, in addition to data integrity errors, other errors recognized by directory data service integrity management module 314 may include: directory data access errors (e.g., failed to read data from an LDAP server), an undersized data source cache error (e.g., indicates that a data source cache or cache index is not large enough to hold all of the requested data in memory), and/or a data replication error (indicates that a data replication operation has failed).

Circular group references may be recognized by directory data service integrity management module 314 when a directory server is being traversed from the top down to determine group membership. For example if group A is a member of group B and group B is a member of group A, directory data service integrity management module 314 may detect this and log an error. Group relationships may be nested many levels deep so a circular group reference may occur several levels down. For example, assuming groups are nested from parent through child from A-E, group B may be member of group E causing a circular group reference. According to some embodiments, a recursive tree traversal algorithm may be used that may determine that a particular node of a tree (i.e., a group) has been visited before. This may indicate a circular group reference. Circular group references may be detected within a single data source or across multiple data sources.

Directory data service integrity management module 314 may log one or more data integrity errors or other errors and alerts may be generated by a separate mechanism. For example, directory data service integrity management module 314 may create an alert file on disk or in other electronic storage. The alert file may contain a timestamp and an identifier indicating a type of alert condition. A process or agent running on network device 170 may periodically poll for alert files, process alert metadata, and send an alert email to one or more users (e.g., registered system administrators). Other communication channels may be used to notify a user including, but not limited to: SMS text messages, voicemail, and/or a webpage posting. According to some embodiments, directory data service 154 may send an alert directly without the use of another process or agent. According to one or more embodiments, directory data service integrity management module 314 or another process, component, or module may send an alert using an interface (e.g., via SNMP, a Windows System Event, or a custom IPC (inter-process communication)).

Detection of data integrity errors by directory data service integrity management module 314 and prompt alerting of a system administrator may enable a system administrator to address issues prior to system degradation or failure.

Directory data service group membership management module 316 may traverse one or more directory data sources to identify members of a group. Directory data service group membership management module 316 may resolve parent group memberships, child group memberships, or both.

Directory data service query generalization module 318 may allow a query (e.g., an LDAP query) to a directory server to use query filter tokens or other mechanisms to define a variety of directory search criteria, including, but not limited to, the matching of email aliases. Query filter tokens and alias matching are discussed in greater detail below in reference to FIG. 8.

Error logging and reporting module 320 may produce logs, reports, or other information associated with directory server integration.

Figure 4:
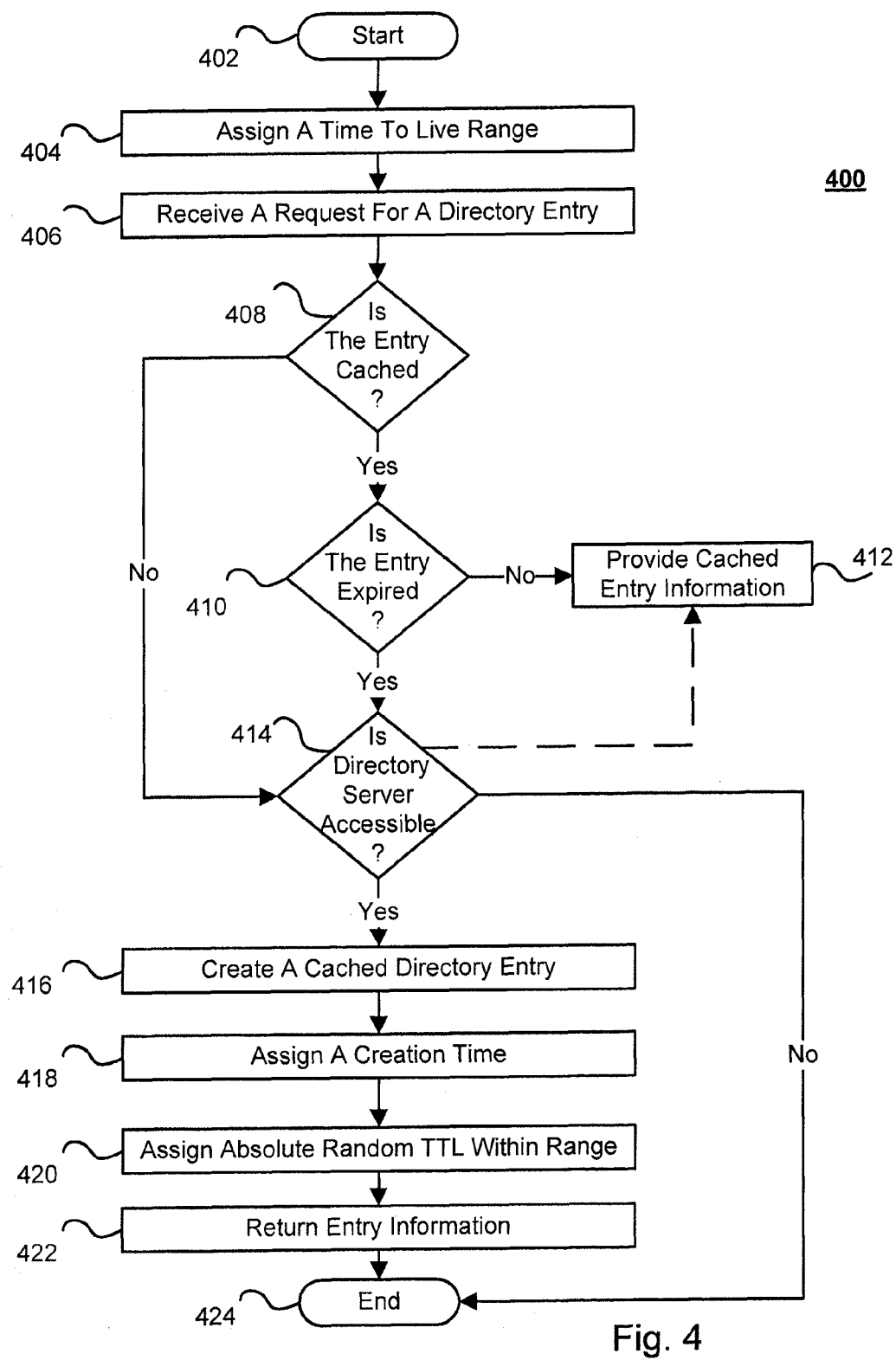
FIG. 4 depicts a method for directory server integration in accordance with an embodiment of the present disclosure.

Referring to FIG. 4, there is depicted a method 400 for directory server integration in accordance with an embodiment of the present disclosure. FIG. 4 is a high level depiction of directory server integration. Other elements such as, for example, a test to determine whether an entry is in a directory server, may be added. At block 402, the method 400 may begin.

At block 404, the method may assign a Time To Live range. A Time To Live range may be specified by an administrator using one or more parameters. According to some embodiments, an administrator or other user may determine a range of permissible expiration times for a cached directory entry by setting a maximum Time To Live parameter and a minimum Time To Live parameter. A cached entry may be assigned an expiration date or Time To Live setting within a range determined by the maximum Time To Live parameter and the minimum Time To Live parameter. A Time To Live setting may be set at the time of the creation of a cached directory entry. According to other embodiments, an administrator or other user may determine a range of permissible expiration times for a cached directory entry by setting a Time To Live parameter and a Time To Live variance parameter. The Time To Live variance parameter may determine a maximum amount a cached directory may vary from a Time To Live parameter. For example, Time To Live variance parameter may be expressed as a percentage (e.g., a percentage between 0% and 100%). The Time To Live variance parameter may be converted to a decimal, subtracted from 1 and then multiplied by the TTL to determine a minimum TTL. The Time To Live variance parameter may then be converted to a decimal, added to 1 and then multiplied by the TTL to determine a maximum TTL. Other methods and parameters may be used to identify or determine a range of Time To Live settings over which to distribute individual cache entry TTL settings.

At block 406, a request for a directory entry may be received. For example, a gateway may request directory data for recipient validation, message routing, authentication, application of a policy, quarantine of a suspected spam email, or for other purposes.

At block 408 it may be determined whether the requested directory entry is cached. If the requested directory entry is cached, the method may continue at block 410. If the requested directory entry is not cached, the method may continue at block 414.

At block 410, the method 410 may determine whether an entry is expired. According to some embodiments, the expiration of a cache entry may be determined by calculating elapsed time from a creation time of the cache entry and comparing the elapsed time to a Time To Live setting for the cached directory entry. There may be several different algorithms used to calculate a TTL for a cache entry. For example, an entry Time To Live (entryTTL) may be calculated as:

entryTTL=minTTL+((maxTTL−minTTL)*(ttlSpreadFactor/100.0)); //seconds

A ttlSpreadFactor may be a random number (e.g., 50) between 0 and 100 (inclusive). MinTTL may represent a minimum Time To Live for a cache entry and max TTL may represent a maximum Time To Live for the entry. Thus MinTTL and MaxTTL may determine a permissible range and the ttlSpreadfactor may be a random number used to distribute cache entries along that range.

At block 412, if the cache entry is not expired, cached entry information may be provided to respond to the request.

At block 414, it may be determined whether a directory server is accessible. If a directory server is accessible, the method may continue at block 416. If a directory server is not accessible, the method may end at block 424. According to some embodiments (represented by the dashed line) if the directory server is not accessible, cached entry information may be provided at block 412. For example, as discussed above in reference to FIG. 1, there may be a fast failover mode which may initiate when several data access failures have been detected in a short period of time. This may cause the data source to immediately serve up the cache data if it is available, whether it is expired or not, or to fail immediately with an exception (e.g., DataAccessUnavailableException) without incurring the overhead of a data access call.

At block 416, the directory entry may be retrieved from the directory server or source and a cached directory entry may be created.

At block 418, a creation time may be assigned to the cached directory entry.

At block 420, an absolute random value may be assigned to a cached directory entry which may determine a Time To Live (TTL) for the cached directory entry. The random value may assign a TTL within a range specified by an administrator. According to some embodiments, other methods of assigning a random value may be used. As discussed below in reference to FIG. 5, a Time To Live (TTL) spread factor may be used.

At block 422, directory entry information may be returned in response to the request.

At block 424, the method 400 may end.

Figure 5:
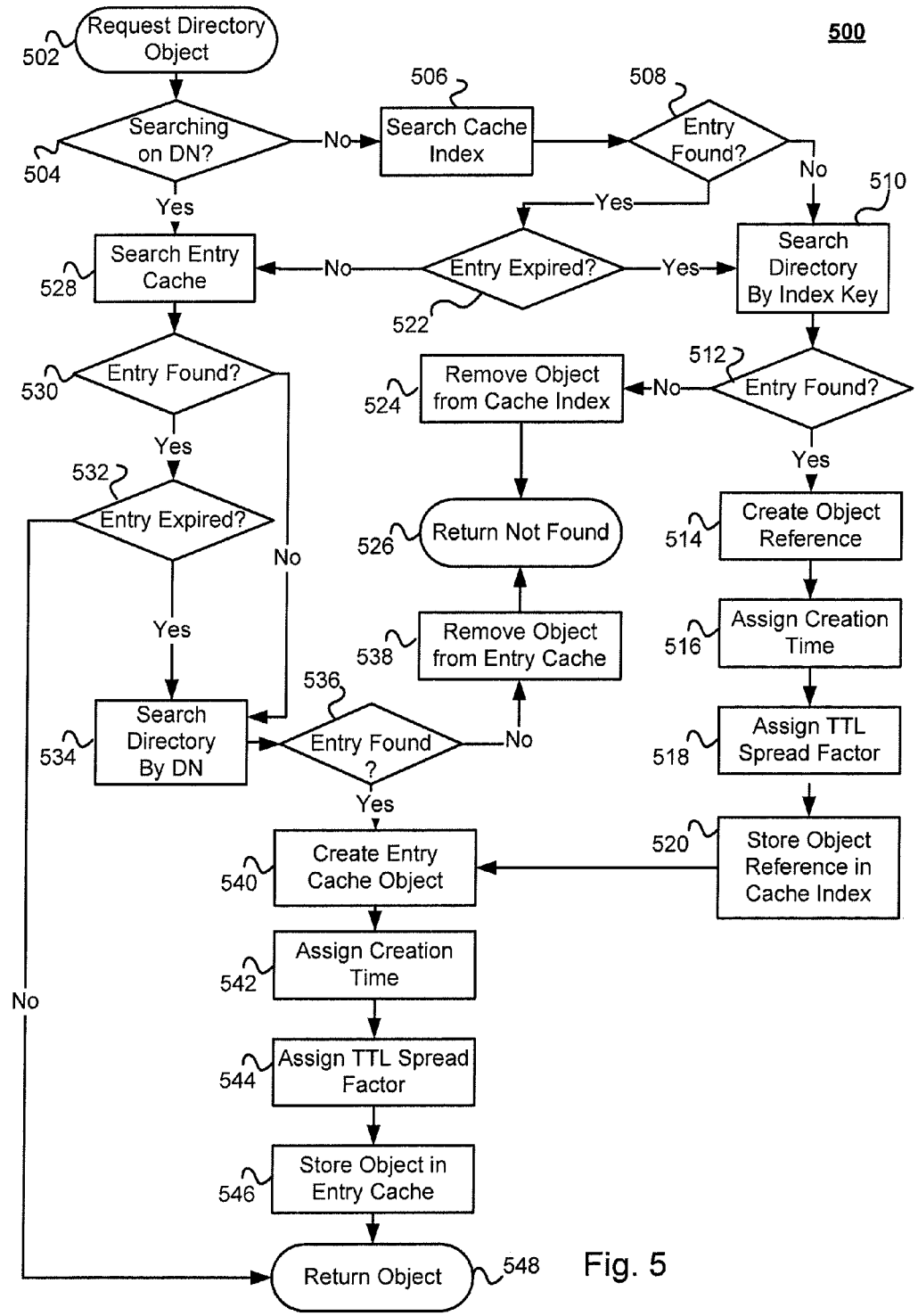
FIG. 5 depicts a method for directory server integration in accordance with an embodiment of the present disclosure.

Referring to FIG. 5, there is depicted a method 500 for directory server integration in accordance with an embodiment of the present disclosure. At block 502, the method 500 may begin with a request for a directory object.

At block 504, it may be determined whether a request is searching on an LDAP Distinguished Name (DN) (e.g., "userid=jmsmith, dc=domain, dc=com"). If a request is searching using a distinguished name the method may continue at block 528. If a request is searching using another attribute (e.g., an email address "jsmith@domain.com" or a username "jsmith") the method may continue at block 506.

At block 506, a cache index may be used to search using an attribute other than a distinguished name.

At block 508, it may be determined whether an entry was found in a cache index. If a corresponding entry was found, the method may continue at block 522, otherwise the method may continue at block 510.

At block 510, a directory server may be searched by an attribute value corresponding to the identified cache index key.

At block 512, if a directory entry was found using an identified cache index entry key the method may continue at block 524, else the method may continue at block 514.

At block 514, an object reference may be created for the cache index.

At block 516, a creation time may be assigned to the object reference in the cache index.

At block 518, a Time To Live (TTL) spread factor may be assigned to the cache index object. The TTL spread factor may be a random number (e.g., between 0 and 100 (inclusive)) and may subsequently be used to determine a TTL for the cache index object within a specified permissible range of TTL values. According to some embodiments, other methods of assigning a random value may be used. For example, as discussed above in reference to FIG. 4, an absolute random number may be used.

At block 520, an object reference may be stored in the cache index.

At block 522, it may be determined whether an entry identified in a cache index is expired. If an entry is expired, the method may continue at block 510. If an identified entry in a cache index is not expired, the method may continue at block 528.

At block 524, if an entry has not been found in a directory server, a corresponding object may be removed from the cache index.

At block 526, an entry not found message may be returned.

At block 528, entry cache may be searched using a distinguished name.

At block 530, it may be determined whether an entry has been found. If an entry has been found in entry cache, the method 500 may continue at block 532. If an entry has not been found, the method 500 may continue at block 534.

At block 532, an identified directory cache entry may be tested to determine whether the entry has expired. As discussed above, expiration may be determined using one or more attributes or settings including a TTL Spread Factor, a creation date, and elapsed time since a creation date. If a cached directory entry has expired the method 500 may continue at block 534. If a cached directory entry has not expired, the method may continue at block 548.

At block 534, a directory server may be searched using a distinguished name (DN).

At block 536, it may be determined whether a directory entry matching the requested object has been found in a directory server. If a directory entry has been found, the method may continue at block 540. If an entry has not been found the method 500 may continue at block 538.

At block 538, a corresponding object may be removed from an entry cache.

At block 540, a corresponding directory cache entry may be created.

At block 542, a creation time may be assigned to a cached directory entry.

At block 544, a Time To Live (TTL) spread factor may be assigned to the entry cache object. The TTL spread factor may be a random number (e.g., between 0 and 100 (inclusive)) and may be subsequently used to determine a TTL for the entry cache object within a permissible range of Time To Live values. According to some embodiments, other methods of assigning a random value may be used. For example, as discussed above in reference to FIG. 4, an absolute random number may be used.

At block 546, a directory entry object may be stored in cache.

At block 548, the method may end.

Referring to FIGS. 6A, 6B, and 6C there is depicted an interface for setting directory data service cache parameters in accordance with an embodiment of the present disclosure. Many different methods may be used for randomizing cache entry expiration times. For example, as discussed above in reference to FIG. 5, a cache entry may be assigned a normalized TTLSpreadFactor, which may properly scale the TTL of a cache entry when other parameters are modified (e.g., a MinTTL parameter and a maxTTL parameter). Other embodiments may use an absolute random TTL assigned to a cache entry at creation time, the assignment within a specified range (e.g., specified by a minTTL parameter and a maxTTL parameter). Another embodiment may use a random cache entryTTL which may be calculated each time a directory object is requested from a cache. Other variations of randomizing cache entry TTL are possible and contemplated.

According to some embodiments, an administrator or other user may determine a range of permissible expiration times for a cached directory entry by setting a maximum Time To Live parameter and a minimum Time To Live parameter. For example, as illustrated in FIG. 6A, a minimum Time To Live parameter of 43200 seconds may be specified. A maximum Time To Live parameter exemplary setting of 129600 seconds is also displayed in FIG. 6A. The minimum Time To Live parameter settings may be determined by an administrator to trade off between load for refreshing cache and staleness of directory entries. A cached entry may be assigned an expiration date or Time To Live setting within a range determined by the maximum Time To Live parameter and the minimum Time To Live parameter. A Time To Live setting may be set at the time of the creation of a cached directory entry. According to other embodiments, an administrator or other user may determine a range of permissible expiration times for a cached directory entry by setting a Time To Live parameter and a Time To Live variance parameter. The Time To Live variance parameter may determine a maximum amount a cached directory may vary from a Time To Live parameter. For example, Time To Live variance parameter may be expressed as a percentage (e.g., a percentage between 0% and 100%). As illustrated in FIG. 6B, a TTL parameter is set for 86400 seconds and a TTL variance parameter is set at 50%. The Time To Live variance parameter may be converted to a decimal, subtracted from 1 and then multiplied by the TTL to determine a minimum TTL. The Time To Live variance parameter may then be converted to a decimal, added to 1 and then multiplied by the TTL to determine a maximum TTL. Other methods and parameters may be used to identify or determine a range of Time To Live settings over which to distribute individual cache entry TTL settings. According to some embodiments, a TTL range, a TTL, or a TTL variance may increase or decrease based on one or more factors. For example, a TTL and/or a TTL range may increase or decrease based on a cache size, a directory server load or other factors. According to one or more embodiments, a TTL range may be different based on a directory data source. For example, if a portion of cache is associated with a first directory data source and a second portion of cache is associated with a second directory data source, the different portions may be assigned different TTL ranges.

Referring to FIGS. 7A, 7B, and 7C there is depicted an interface for setting directory data service cache parameters in accordance with an embodiment of the present disclosure.

According to some embodiments, whether a cache entry has expired may be determined by calculating the elapsed time since the creation time of the cache entry and comparing the elapsed time to the Time To Live (TTL) for the entry. As illustrated in FIG. 7A, an exemplary cached directory entry creation timestamp may be 1267158467763 milliseconds (MS). A timestamp may be created using an Operating System API to obtain a system time at the time of a creation of a cached directory entry. A TTL spreadfactor, which may have been randomly assigned at the time of creation of the cached directory entry, may be 39. As described above, there may be several different algorithms used to calculate a TTL for a cache entry. For example, an entry Time To Live (entryTTL) may be calculated as:

$$entryTTL = minTTL + ((maxTTL - minTTL) * (ttlSpreadFactor/100.0)); //seconds$$

A ttlSpreadFactor may be a random number (e.g., 39) between 0 and 100 (inclusive). MinTTL may represent a minimum Time To Live for a cache entry and MaxTTL may represent a maximum Time To Live for the entry. Thus MinTTL and MaxTTL may determine a permissible range and the ttlSpreadfactor may be a random number used to distribute cache entries along that range.

Using the exemplary TTL spread factor specified in FIG. 7A and the exemplary TTL range specified in FIG. 7B, the Time To Live (TTL) for a cache entry may be calculated as:

$$ENTRY\ TTL = 43200 + ((129600 - 43200)) * (39/100) = 76896\ seconds.$$

Using the exemplary TTL spreadfactor specified in FIG. 7A and the exemplary TTL range specified in FIG. 7C, the Time To Live (TTL) for a cache entry may be calculated as:

$$ENTRY\ TTL = 86400 + ((259200 - 86400)) * (39/100) = 153792\ seconds.$$

Assignment of a normalized TTL spread factor may allow entry TTL values to scale naturally when MinTTL and/or MaxTTL are modified.

Elapsed time may be calculated by one or more algorithms. For example, elapsed time may be calculated as:

elapsed=(currentTime−creationTime)*1000; //seconds

Once elapsed time and the Time To Live for the cache entry have been determined, the expiration determination may be:

isExpired=(elapsed>entryTTL).

According to an exemplary embodiment, directory data service (DDS) integration may be implemented using a DDS business logic layer. The DDS business logic layer may be comprised of the following parts:

DDS API locking layer: this layer may ensure that the system is not shutdown, restarted, or otherwise halted while processing DDS client requests. It may synchronize server reinitialization with client request processing. It may implement the DDS API with locking and delegate one or more requests to the DDS API layer.

Business component layer: this layer may implement the directory functions and server reinitialization. It uses the data access, cache, and config layers to service client requests. It uses the config layer to perform server reinitialization. It notifies the cache and data access layers of server reinitialization.

Cache layer: this layer may be responsible for caching directory model objects in memory. A directory model object may represent directory entries such as users, groups, and/or distribution lists. A model object may be indexed by one or more email addresses such as, but not limited to the lookup email address, and a Unique Identifier (UID). For the authentication function, user objects may be indexed by username and UID. References to non-existent directory objects may be stored in a negative cache. The UIDs contained within the model objects may be pooled to reduce memory consumption.

Config layer: this layer may parse configuration files (e.g., ddsconfig.xml, userprefs.xml, and bmiconfig.xml) from disk. The files may be converted to config objects and stored in memory. The DDSConfig object contains data source information and may be primarily used by the data access layer. This object also contains cache settings and profile to data source mappings which may be used by the cache and business component layers. The UserPreferences and PolicyConfig objects may be used in processing address resolution requests.

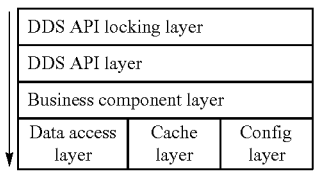

The DDS API locking layer may synchronize client request processing with server reinitialization. However, to ensure that a profile id passed from the Engine to the DDS is valid the Control Center may synchronize Engine reinitialization with DDS reinitialization.

Business Layer Classes
DDS API Locking Layer
ConcurrentDDS: this class may implement the DirectoryDataService interface and may use a read/write lock for synchronizing server reinitialization with client request processing. The read lock may be held simultaneously by multiple client requests so long as the write lock is not acquired. The write lock may be exclusive and may be acquired when the server is kicked. If readers are active and a writer enters the lock then no subsequent readers may be granted the read lock until after that writer has acquired and released the write lock. A single instance of this class may be instantiated by the Spring framework. The instance may need to be initialized with an object that implements the DirectoryDataService interface.

Business Component Layer
AuthenticationManager: this singleton may implement the directory functions related to the authentication function type. It performs quarantine end user login. A test method may be available.

QuarantineResolutionManager: this singleton may implement the directory functions related to the quarantine address resolution function type. It performs quarantine address resolution. A test method may be available.

RecipientValidationManager: this singleton may implement the directory functions related to the recipient validation function type. It performs MTA recipient validation. A test method may be available.

RoutingManager: this singleton may implement the directory functions related to the routing function type. It retrieves MTA routing alternate mailhost and alternate address information. A test method may be available.

AddressResolutionManager: this singleton may implement the directory functions related to the address resolution function type. It performs Engine address resolution and the 'all groups' function. Test methods may be available.

ResolvedAddress: this transfer object may be returned in response to Engine address resolution. It provides access to the Recipient model object and a list of ResolvedRecipient objects.

ResolvedRecipient: this transfer object may provide access to the Recipient model object, a list of Group and DistributionList model objects the recipient is a member of, and the user preferences xml associated with the recipient.

DirectoryDataServer: this singleton may perform server initialization. It notifies the config layer that there are new configuration files to load. It passes the new DDSConfig object to the cache, business, and data access layers. These layers may detect changes in configuration by comparing the previous DDSConfig object with the new one.

EntryStore: this class may wrap an instance of EntryCache and EntryDAO. It provides access to the cached objects while enforcing the TTL logic. One instance of this class may be created per data source function.

EntryStoreFactory: this singleton may create an EntryStore object for each data source function in DDSConfig. An EntryStore may be retrieved by data source ID and function type. This singleton may be notified with a new DDSConfig object when the server is reinitialized.

EntryMart: this class may map to a profile and contain an array of EntryStore objects. It performs a cache first search on the EntryStore objects as its main function.

EntryMartFactory: this singleton may create an EntryMart object for each profile in DDSConfig. An EntryMart may be retrieved by profile ID. This singleton may be notified with a new DDSConfig object when the server is reinitialized.

Config Layer
DDSConfigFactory: this singleton may parse the ddsconfig.xml file into a DDSConfig object at server startup and reinitialization. If the last modification date on the file is unchanged then the file may not be reloaded.

DDSConfig: a config object which may represent the contents of the ddsconfig.xml file.

PolicyConfigFactory: this singleton may parse the bmiconfig.xml file into a PolicyConfig object at server startup and reinitialization. If the last modification date on the file is unchanged then the file may not be reloaded.

PolicyConfig: a config object containing the directory group UIDs which may be mapped to any group policy in the bmiconfig.xml file.

UserPreferencesFactory: this singleton may parse the userprefs.xml file into a UserPreferences object at server startup and reinitialization. If the last modification date on the file is unchanged then the file may not be reloaded.

UserPreferences: a config object representing the contents of the userprefs.xml file. The user preferences xml string for each user may be base64 encoded.

Cache Layer

Entry: this interface may model one or more directory objects. It may provide access to the UID (i.e. DN) and member Of attributes.

Recipient: this interface may model directory objects that have a primary deliverable address. It may extend the Entry interface and provides access to the primary deliverable address, alias addresses, and other custom attributes.

RecipientRef: this class may provide a way to reference a Recipient object by email address. The reference refers to the Recipient object by UID.

InvalidRecipient: this class may hold a reference (an email address) to a non-existent directory object. It is a negative cache entry and may be used for negative caching.

MemberList: this interface may model directory objects that contain lists of members. It extends the Entry interface and provides access to the member list.

User: this class may model a directory user object. It implements the Recipient interface.

UserRef: this class may provide a way to reference a User object by username. The reference refers to the User object by UID.

Group: this class may model a directory group object. It implements the MemberList interface. It provides access to the group name (e.g. cn).

DistributionList: this class may model a directory group object with a primary deliverable address. It implements the Recipient and MemberList interfaces.

Attribute: this class may provide access to custom attributes on user and group directory objects such as those used by the routing directory function.

EntryCache: this interface may define the operations required to get, add, and remove Entry, RecipientRef, UserRef, and InvalidRecipient objects from a cache. It may also define the set of runtime cache management operations such as setting cache sizes or purging cached entries.

Public Iinterface EntryCache

```
{
    public Entry getEntry(String uniqueId);
    public void addEntry(Entry entry);
    public Entry removeEntry(String uniqueId);
    public void setMaxEntries(int maxEntries);
    public RecipientRef getRecipientRef(String emailAddress);
    public void addRecipientRef(RecipientRef ref);
    public RecipientRef removeRecipientRef(String emailAddress);
    public void setMaxRecipientRefs(int maxRecipientRefs);
    public UserRef getUserRef(String userName);
    public void addUserRef(UserRef ref);
    public UserRef removeUserRef(String userName);
    public void setMaxUserRefs(int maxUserRefs);
    public InvalidRecipient getInvalidRecipient(String emailAddress);
```

-continued

```
    public void addInvalidRecipient(InvalidRecipient rcpt);
    public InvalidRecipient removeInvalidRecipient(String emailAddress);
    public void setMaxInvalidRecipients(int maxInvalidRecipients);
    public void purge( );
}
```

LRUEntryCache: this class may implement the EntryCache interface. It caches Entry, RecipientRef, UserRef, and InvalidRecipient objects in memory. One instance of this class may be created for each data source function. It uses an access-ordered LinkedHashMap to index Entry objects by UID. RecipientRef objects may be indexed by lookup address in a separate access-ordered LinkedHashMap. UserRef objects may be indexed by username in a separate access-ordered LinkedHashMap. InvalidRecipient objects may be also indexed by lookup address in a separate access-ordered map. When the max size on a map is exceeded the least recently used entry may be removed from the map. The cached model objects refer to other directory objects by UID (i.e. DN) and to reduce memory usage these UIDs may be pooled using an InternPool. There may be one InternPool instance per cache.

InternPool: this class may be a string pool. It uses a WeakHashMap to index the String objects. Its entries are automatically garbage collected when they are no longer referenced.

EntryCacheFactory: this singleton may create an LRUEntryCache object for each data source function in DDSConfig. An EntryCache may be retrieved by data source ID and function type. This class may maintain a reference to the current DDSConfig object at all times. This singleton may be notified with a new DDSConfig object when the server is reinitialized. Cache instances may be invalidated by comparing the current config to the new config.

Cache Design

Cache design may be influenced by one or more factors. First, cached entries exceeding their TTL (Time To Live) should be used when their associated data source connection is down. Therefore, there may be no proactive pruning of expired cache data. Instead, cache entries may remain in the cache until one of two things happen—an entry is replaced with a new version or an entry is evicted because the cache size is exceeded. Secondly, only a single copy of a directory object should be cached. This is to prevent filling up the cache with different versions of the same directory object. This also ensures that no matter how the directory object is acquired (by unique id, primary deliverable address, alias address, lookup address, or username) the same version may be returned.

By default, the EntryCacheFactory singleton instance may be serialized to disk using default java serialization on server shutdown. The serialized instance may be loaded into memory on server startup. This may allow all in memory caches to persist across server restarts. Using ObjectOutputStream, multiple references to a single object may be encoded using a reference sharing mechanism so that graphs of objects can be restored to the same shape as when the original was written. In other words, pooled strings may continue to be pooled after deserialization. The memory footprint may not increase after deserialization. Because serialized java objects are sensitive to class version changes, the serialized cache data may be ignored after software update.

Table 1 below shows the sample contents of an exemplary LRUEntryCache.

```
entries
cn=user1,ou=ou1,dc=brightmail,dc=com -> User@757aef
cn=dlist1,ou=ou1,dc=brightmail,dc=com -> DistributionList@347bde
cn=group1,ou=ou1,dc=brightmail,dc=com -> Group@937slo
recipients
user1@brightmail.com -> RecipientRef{ user1@brightmail.com ;
cn=user1,ou=ou1,dc=brightmail,dc=com }
dlist1@brightmail.com -> RecipientRef{ dlist1@brightmail.com;
cn=dlist1,ou=ou1,dc=brightmail,dc=com }
users
ayman mobarak -> UserRef{ ayman mobarak ;
cn=user1,ou=ou1,dc=brightmail,dc=com }
sales@brightmail.com -> InvalidRecipient { sales@brightmail.com }
admin@brightmail.com -> InvalidRecipient { admin@brightmail.com }
```

String Pooling

The UIDs within the cache may be pooled using an InternPool to reduce memory consumption. There is potential for huge savings as the following example illustrates:

Assuming the Following:

100K users 50K dlists 200 users in each dlist each DN string is 50 bytes

With no string pooling the total size of all DN strings may be:

$$100K*50+50K*50+50K*200*50=5M+2.5M+500M=507.5M$$

With string pooling the total size of all DN strings may be:

$$100K*50+50K*50=5M+2.5M=7.5M$$

Directory Objects and TTL

The business component layer may enforce TTL on cached directory objects. The creation time (in milliseconds) may be set on each model object (User, DistributionList, Group, RecipientRef, UserRef, and InvalidRecipient) before adding it to the cache. Upon retrieval, the creation time may be compared to the current time to determine if the object has expired. If the object has expired, then an attempt may be made to refresh the object from the data source. If a data source connection failure occurs then the expired object may be used instead.

To prevent many cached objects from expiring at the same time a TTL spread factor may be set on each object before adding it to the cache. The TTL spread factor may be used to randomize the TTL within a range of 101 discrete values between min TTL and max TTL. The expiration time of an object may be calculated as follows:

$$expirationTime=creationTime+minTTL+((maxTTL-minTTL)*(TTLSpreadFactor/100.00))$$

where creationTime may be in seconds, minTTL may be the minimum Time To Live in seconds, maxTTL may be the maximum Time To Live in seconds, and TTLSpreadFactor may be a randomly chosen number between 0 and 100 (inclusive). For example, if min TTL is 43200 seconds (12 hours) and max TTL is 129600 seconds (36 hours) then cached objects may expire sometime between 12 and 36 hours as dictated by their ttlSpreadFactor values. The TTLSpreadFactor may not apply to invalid recipients.

If the system clock is changed, the expiration time on objects already in the cache may increase or decrease accordingly.

EXAMPLE 1

The Following Example Shows TTL Checking of Entry Objects

```
public Entry getEntry(String uniqueId) throws
DataAccessException
{
    Entry entry = cache.getEntry(uniqueId);
    if(entry != null && isStale(entry))
    {
        try
        {
            entry = source.getByUniqueId(uniqueId);   // get
entry from data source
            if(entry != null)
            {
                addEntry(entry);
            }
            else
            {
                cache.removeEntry(uniqueId);
            }
        }
        catch(DataAccessTransientException e)
        {
            log.warn("using stale cache entry "+ entry, e);
        }
    }
    return entry;
}
```

EXAMPLE 2

The Following Example Shows TTL Checking of RecipientRef Objects

```
public Recipient getRecipient(String emailAddress) throws
DataAccessException
{
    Recipient rcpt = null;
    RecipientRef ref = cache.getRecipientRef(emailAddress);
    if(ref != null)
    {
        if(isStale(ref))
        {
            try
            {
                rcpt = source.getByEmail(emailAddress); // get
entry from data source
                if(rcpt != null)
                {
                    addRecipient(emailAddress, rcpt);
                }
                else
                {
                    cache.removeRecipientRef(emailAddress);
                }
            }
            catch(DataAccessTransientException e)
            {
                log.warn("using stale cache entry "+ ref, e);
                rcpt = getRecipient(ref);
            }
        }
        else
```

-continued

```
        {
            rcpt = getRecipient(ref);
        }
    }
    return rcpt;
}
private Recipient getRecipient(RecipientRef ref)
{
    Entry entry = cache.getEntry(ref.getUniqueId( ));
    if(entry instanceof Recipient)
    {
        return (Recipient) entry;
    }
    return null;
}
```

Directory Functions

A common task to all the directory functions may be to find a recipient among the caches and data sources associated with a profile. The cache first search algorithm and how it relates to each directory function is described below.

Cache First Search

The cache first search algorithm may begin by searching the cache instances for the recipient until the recipient is found or there are no more caches to search. If the recipient is not found in a cache, it then searches data sources that don't have a negative cache entry for the recipient. If the recipient is found in exactly one data source, it adds the recipient to the associated cache. If the recipient is not unique, it returns an error. If the recipient is not found in any data source then it adds a negative cache entry to each cache. This logic may ensure that the lookup address is unique across all data sources.

Recipient Validation

This recipient search may be a 'cache first' search. However, if the lookup address is not unique then true may be returned instead of error.

Address Resolution

Address resolution may begin with a 'cache first' search for the recipient. Then, using the data source containing the recipient, recursively fetch the recipient's descendants. If the recipient or any of its descendants is a user or an empty distribution list then add it to the list of user targets. Next, for each user target populate its group memberships. Group memberships may be built in a background thread.

Message Routing

This recipient search may be a 'cache first' search.

Quarantine Authentication

Quarantine authentication begins with a 'cache first' search for the user. If the user is found, then authenticate the user against the associated data source.

Quarantine Address Resolution

This recipient search may be a 'cache first' search.

Uniqueness of Lookup Address and Username

Uniqueness of lookup address and username may be enforced in the data access and business layers. The following general statements may be true:

The 'cache first' search algorithm ensures uniqueness of the lookup address and username across all data sources within a profile.

A cached object may be indexed by lookup address or username and may not be indexed by an attribute value that has not been tested for uniqueness across the data sources within a profile.

A cached object may not be retested for uniqueness for as long as it exists in the cache. This may be true even when the cached object has exceeded its TTL.

When a new data source is added to an existing profile, the cached entries created prior to the new data source may not be tested for uniqueness against the newly added data source.

Cache Invalidation

A cache may be invalidated if any the following changes: /ddsConfig/dataSources/dataSourceLDAP/directoryType /ddsConfig/dataSources/dataSourceLDAP/servers/server/hosts//*  /ddsConfig/dataSources/dataSourceLDAP/servers/server/port  /ddsConfig/dataSources/dataSourceLDAP/functions//*

Cached directory objects that have exceeded their TTL may be kept in the event of an LDAP connection failure.

Circular group and distribution list membership references may not cause circular processing. This may apply to address resolution only. A list of visited nodes may be used to prevent infinite recursion. There may be no limit to the number of nested groups traversed.

Configurable Time to Live (TTL) Function for Cached Entries

The Minimum and Maximum TTL on cached directory objects may be configurable for each directory data source.

Configurable Cache Size (Number of Entries)

The cache size may be configurable for each directory data source, as the associated cache index sizes.

Cache Purge on Demand

The caches for each directory data source can be individually cleared by a Control Center administrator.

Figure 8:
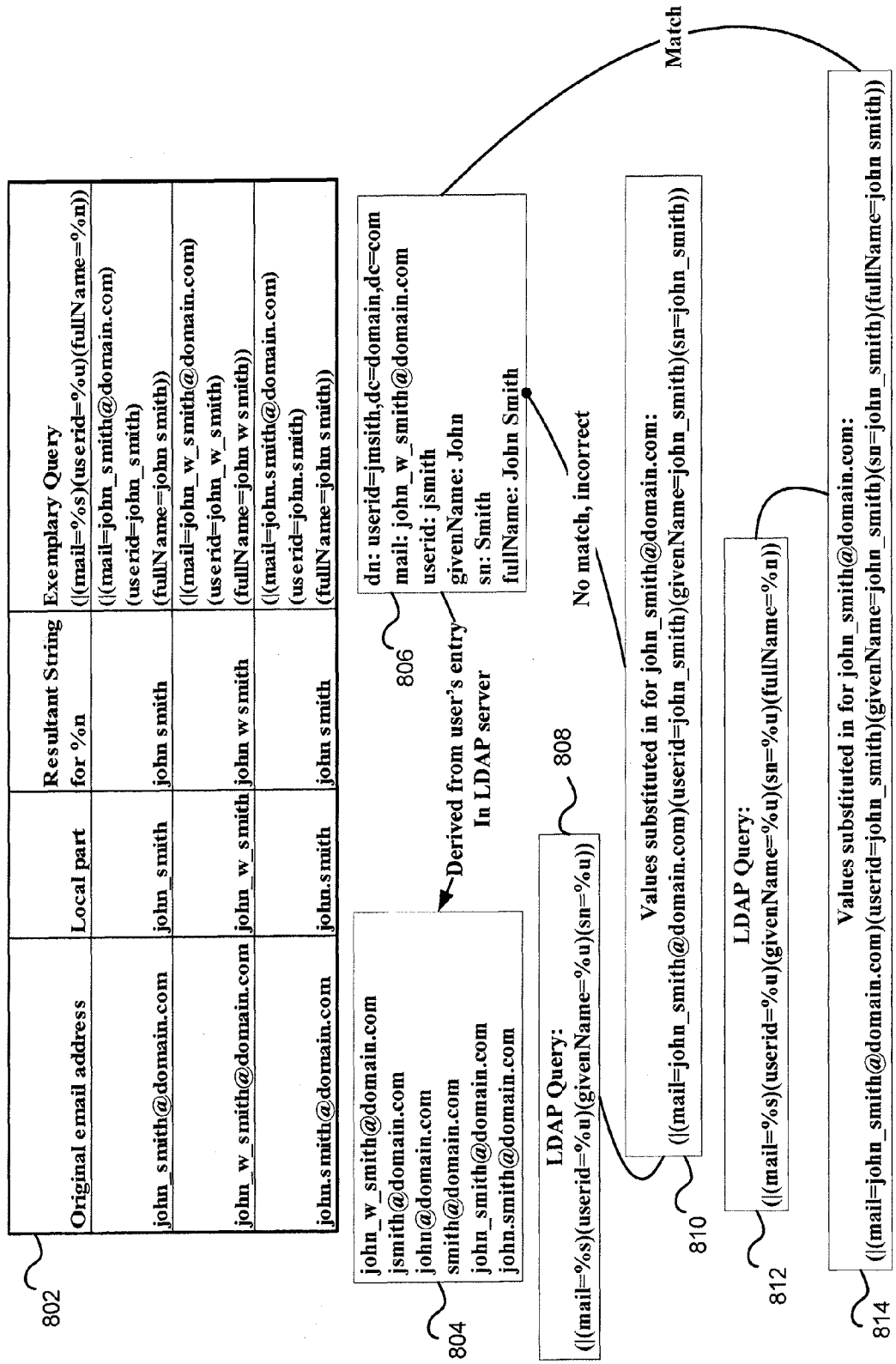
FIG. 8 depicts a method of matching directory entries using query filter tokens in accordance with an embodiment of the present disclosure.

FIG. 8 depicts a method of matching directory entries using query filter tokens in accordance with an embodiment of the present disclosure. According to some embodiments, when querying a directory server, query filter tokens may be used. Query filter tokens may allow a token to operate as a placeholder for a parameter in a query to be substituted at execution for the corresponding parameter token. For example, query filter tokens may include:

| Recipient address part | Token | Example |
|---|---|---|
| Full address | % s | some_user@exampledomain.com |
| User local part | % u | some_user |
| Domain part | % d | exampledomain.com |
| Full name | % n | some user (consecutive periods and underscore characters may be replaced with a space character) |

The % s token may be a placeholder in a query for a full email address. The % u token may be a placeholder in a query for a local portion of an email address. The % d token may be a placeholder in a query for a domain portion of an email address. The % n token may be a placeholder in a query for a full name, which may be derived by taking the local part of an email address and replacing period and underscore characters with a space character.

In addition to a 'mail' attribute value, an administrator of one or more types of mail servers may configure their server to accept email for a user based on their first name and/or last name, or a number of combinations of the thereof.

Given an Example Entry:
dn: CN=John Bigboote, O=sfdom1
givenname: John
objectclass: dominoPerson
uid: JBigboote_uid
uid: JBigboote_uid2@eng.symantec.com
mail: john.bigboote.mail@eng.symantec.com cn: John Bigboote
sn: Bigboote A mail server configured to receive mail for eng.symantec.com and aliasdomain.com may be configured to recognize one or more of the following as valid recipients:
john@aliasdomain.com
john@eng.symantec.com
bigboote@aliasdomain.com
bigboote@eng.symantec.com
jbigboote_uid@aliasdomain.com
jbigboote_uid@eng.symantec.com
jbigboote_uid2@eng.symantec.com
john.bigboote.mail@eng.symantec.com
john.bigboote.mail@aliasdomain.com
john.bigboote@aliasdomain.com
john.bigboote@eng.symantec.com
john_bigboote@aliasdomain.com
john_bigboote@eng.symantec.com Because a mail server administrator may configure their server not to support these aliases (for instance, considering the 'mail' attribute values as the only deliverable addresses for a user), the administrator may also be able to configure their directory server query to be inclusive or exclusive of these different address forms. Large mail server deployments may use only the 'uid' and 'mail' attribute values as deliverable addresses. Such a configuration, continuing the example above, would support the following addresses:
jbigboote_uid@aliasdomain.com
jbigboote_uid@eng.symantec.com
jbigboote_uid2@eng.symantec.com
john.bigboote.mail@eng.symantec.com
john.bigboote.mail@aliasdomain.com According to some embodiments, a query filter may be used to capture one or more of these
(|(mail=% s)(uid=% s)(uid=% u))
If an administrator chooses to allow aliasing to a user's full name, the query can be changed to
(|(mail=% s)(uid=% s)(uid=% u)(cn=% n))
Note here the use of the %n token, which may substitute a white space character for a period or underscore in the local part of an email address, such that john.bigboote@eng.symantec.com or john_bigboote@eng.symantec.com becomes (cn=john bigboote).

If the administrator also allows aliasing to a user's first and last name, the query may be changed to
(|(mail=% s)(uid=% s)(uid=% u)(cn=% n)(givenName=% u)(sn=% u))
When aliasing on first and last name is allowed, it may be far more likely that a namespace 'collision' may occur between two or more user entries having the same first and/or last name. For instance, if our hypothetical directory server also contained an entry like
dn: CN=John Whorfin, O=sfdom1
givenname: John
. . . .
cn: John Whorfin
sn: Whorfin An SMTP server itself may handle an attempted delivery to john@aliasdomain.com by returning a 5xx error to the SMTP client with a text message that the recipient can't be uniquely identified. Since the directory data service LDAP query may return two entries for which (givenName=john), the condition may be handled as a data integrity error as described above.

As illustrated in FIG. 8, exemplary full addresses, local portions of email addresses, corresponding full names, and exemplary queries are illustrated in element 802. An exemplary directory entry is illustrated in element 806. Some directory servers (e.g., IBM Lotus Domino) may support a plurality of email aliases for a directory entry. As illustrated in element 804, multiple email aliases may be supported for the directory entry listed in element 806. As illustrated in elements 808 and 810, if a query is received to validate an email address of "john_smith@domain.com", a directory server query using tokens % s and % u may not find the directory entry. However, as depicted in elements 812 and 814, if a % n token is used to query on a fullname, a match may be found. A % n token may replace periods or underscores in a local part of an email address with a space to derive a fullname for querying.

At this point it should be noted that directory server integration in accordance with the present disclosure as described above typically involves the processing of input data and the generation of output data to some extent. This input data processing and output data generation may be implemented in hardware or software. For example, specific electronic components may be employed in a directory data service or similar or related circuitry for implementing the functions associated with directory server integration in accordance with the present disclosure as described above. Alternatively, one or more processors operating in accordance with instructions may implement the functions associated with directory server integration in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for directory server integration comprising:
   requesting a directory entry from a directory server;
   detecting, via at least one processor, a data integrity error based at least in part on a response from the directory server; and
   receiving a corresponding expired cached directory entry in response to the request, wherein the corresponding expired cached directory entry is expired based at least in part on a creation time and at least one random value.

2. The method of claim 1, wherein the data integrity error comprises at least one of: email address non-uniqueness; username non-uniqueness; missing or invalid attribute data; and circular group relationships.

3. The method of claim 1, wherein the directory server comprises an Lightweight Directory Access Protocol (LDAP) compliant directory server.

4. The method of claim 1, wherein the request is sent from an electronic device comprising a gateway appliance separate from a host of the directory server.

5. The method of claim 1, wherein the request is sent from an electronic device comprising a host sharing cache among a plurality of gateway appliances separate from a host of the directory server.

6. The method of claim 1, wherein the request is sent from an electronic device comprising an electronic device which uses one or more cached directory entries to provide at least one of: user authentication; recipient validation; address resolution; and message routing.

7. The method of claim 1, wherein the creation time is assigned to the cached directory entry.

8. The method of claim 1, wherein the at least one random value is assigned to the cached directory entry, the at least one random value determining an expiration time for the cached directory entry within a range of permissible expiration times, wherein randomizing the expiration time for the cached directory entry among the range of permissible expiration times for a plurality of cached directory entries reduces an amount of synchronization required between cache memory and the directory server at a point in time.

9. The method of claim 1, further comprising:
   providing an alert containing data integrity error information to an administrator.

10. At least one non-transitory processor readable storage medium storing a computer program of instructions configured to be readable by at least one processor for instructing the at least one processor to execute a computer process for performing the method as recited in claim 1.

11. An article of manufacture for directory server integration, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      request a directory entry from a directory server;
      detect a data integrity error based at least in part on a response from the directory server; and
      receive a corresponding expired cached directory entry in response to the request, wherein the corresponding expired cached directory entry is expired based at least in part on a creation time and at least one random value.

12. The article of manufacture of claim 11, wherein the data integrity error comprises at least one of: email address non-uniqueness; username non-uniqueness; missing or invalid attribute data; and circular group relationships.

13. The article of manufacture of claim 11, wherein the directory server comprises an Lightweight Directory Access Protocol (LDAP) compliant directory server.

14. The article of manufacture of claim 11, wherein the instructions are further configured to be readable from the at least one medium by at least one processor and thereby cause the at least one processor to operate so as to:
   provide an alert containing data integrity error information to an administrator.

15. A system for directory server integration, the system comprising:
   at least one processor configured to:
      request a directory entry from a directory server;
      detect a data integrity error based at least in part on a response from the directory server; and
      receive a corresponding expired cached directory entry in response to the request, wherein the corresponding expired cached directory entry is expired based at least in part on a creation time and at least one random value; and
   at least one memory, coupled to the at least one processor, configured to provide the at least one processor with instructions.

16. The system of claim 15, wherein the data integrity error comprises at least one of: email address non-uniqueness; username non-uniqueness; missing or invalid attribute data; and circular group relationships.

17. The system of claim 15, wherein the directory server comprises an Lightweight Directory Access Protocol (LDAP) compliant directory server.

18. The system of claim 15, wherein the at least one processor is further configured to:
   provide an alert containing data integrity error information to an administrator.

* * * * *